(12) United States Patent
Carvalho et al.

(10) Patent No.: US 12,433,238 B2
(45) Date of Patent: Oct. 7, 2025

(54) PET TOILET

(71) Applicants: Fabio Gaspar De Carvalho, São José do Rio Preto (BR); Lara Crestani Menezes Lorga, São José do Rio Preto (BR); Leinir De Jesus Gaspar De Carvalho, Mirassol (BR)

(72) Inventors: Fabio Gaspar De Carvalho, São José do Rio Preto (BR); Lara Crestani Menezes Lorga, São José do Rio Preto (BR); Leinir De Jesus Gaspar De Carvalho, Mirassol (BR)

( * ) Notice: Subject to any disclaimer, the term of this patent is extended or adjusted under 35 U.S.C. 154(b) by 0 days.

(21) Appl. No.: 18/579,599

(22) PCT Filed: Jul. 13, 2022

(86) PCT No.: PCT/BR2022/050258
§ 371 (c)(1),
(2) Date: Jan. 16, 2024

(87) PCT Pub. No.: WO2023/283713
PCT Pub. Date: Jan. 19, 2023

(65) Prior Publication Data
US 2024/0315193 A1    Sep. 26, 2024

(30) Foreign Application Priority Data

Jul. 13, 2021   (BR) .......................... 1020210137622
Jul. 9, 2022    (BR) .......................... 1020220137080

(51) Int. Cl.
*A01K 1/01* (2006.01)
(52) U.S. Cl.
CPC .................................. *A01K 1/011* (2013.01)
(58) Field of Classification Search
CPC .............................. A01K 1/011; A01K 1/0107
See application file for complete search history.

(56) References Cited

U.S. PATENT DOCUMENTS 4,050,414 A * 9/1977 Knochel .............. A01K 1/0117
                                                          119/164
6,138,609 A * 10/2000 Gordon .................. A01K 1/011
                                                          119/166

(Continued)

FOREIGN PATENT DOCUMENTS

BR          7901264 A       10/1979
BR    132012016842 E2       11/2015
(Continued)

OTHER PUBLICATIONS

International Search Report issued on Aug. 29, 2022, in corresponding International Application No. PCT/BR2022/050258, 7 pages.

*Primary Examiner* — Joshua J Michener
*Assistant Examiner* — Nicole Paige Maccrate
(74) *Attorney, Agent, or Firm* — Maier & Maier, PLLC

(57) ABSTRACT

A toilet designed for use by pets, the solution of which seeks to guarantee that the device toilet or bathroom for dogs and cats can be installed in any place in the home, so as to integrate a flexible bag with the toilet destined to receive the liquid originating from the animal, this bag having a capacity to accommodate a certain volume of urine, and can be discarded at any time. The bag further receives a rubberized plastic "mat" on top, on which the animal positions itself, where it can also carry out its physiological needs, urine or feces, in the latter case to be scooped up by the pet owner with a little bag or similar. This set, both bag and mat area, can be sanitized. The embodiments include an alternative, which operates by an association of electro-mechanical, electronic and wireless communication resources.

8 Claims, 20 Drawing Sheets

(56) References Cited

U.S. PATENT DOCUMENTS

| | | | |
|---|---|---|---|
| 6,453,844 B1* | 9/2002 | Janzen | A01K 1/011 |
| | | | 119/161 |
| 6,941,703 B2 | 9/2005 | Maclean et al. | |
| 9,737,045 B1* | 8/2017 | Scanlan | A01K 1/011 |
| 11,330,792 B1* | 5/2022 | Van Ness | A01K 1/0157 |
| 2012/0118241 A1* | 5/2012 | Smith, II | A01K 1/0107 |
| | | | 119/167 |
| 2013/0228133 A1 | 9/2013 | Kennington | |
| 2014/0114259 A1* | 4/2014 | Durham | A61J 15/0069 |
| | | | 604/533 |
| 2017/0251626 A1* | 9/2017 | Finney | A01K 1/0107 |
| 2017/0273273 A1* | 9/2017 | Chou | A01K 1/0114 |
| 2018/0328016 A1* | 11/2018 | Villalobos Lopez | F16K 15/03 |
| 2021/0185974 A1* | 6/2021 | Cunningham | A01K 1/011 |
| 2021/0195864 A1* | 7/2021 | Carvalho | A01K 1/011 |

FOREIGN PATENT DOCUMENTS

| | | |
|---|---|---|
| BR | 112013004325 A2 | 5/2016 |
| BR | 202016028791 U2 | 6/2018 |
| BR | 102018073116 A2 | 5/2020 |

* cited by examiner

PET TOILET

FIELD

The present application for patent of invention refers to a new toilet designed for use by pets, the solution of which seeks to guarantee that the device toilet or bathroom for dogs and cats can be installed in any place in the home, so as to integrate a flexible bag with the toilet destined to receive the liquid originating from the animal, this bag having a capacity to accommodate a certain volume of urine, and can be discarded whenever he or she so wishes. The bag further receives a rubberized plastic "mat" on top, on which the animal positions itself, where it can also carry out its physiological needs, urine or feces, in the latter case to be scooped up by the pet owner with a little bag or similar. This set, both bag and mat area, can be sanitized.

An alternative, more technological solution, the product comprises a pump that forces the outflow of urine over major distances and regardless of the level thereof. Additionally, one resource already found in the product in another product by the same applicant is present in this product to be patented, particularly related to the release of water to wash the tray, though this is made automatically and regardless of the distance at which the operator is found. It is worth emphasizing that this product offers connectivity with the internet, enabling the user to receive notices via cellphone messaging applications, have access to the cleaning process whenever his or her dog or cat goes to the toilet and schedules pre-set times for the sanitary device to perform the washing process.

The present invention is designed for the market of pet products, which is showing major growth nowadays, and which uses various, primarily simple technologies and, in one constructive option, in the mechanical, electronic, software, electro-electronic areas, among others.

BACKGROUND

The current state of the art comprises, from a filing by the same applicant of the present patent, document BR 2020160287915U2, filed on Dec. 8, 2016 and published on Jun. 26, 2018, entitled "ARRANGEMENT APPLIED TO TOILET FOR DOGS WITH FLUSH CONNECTED TO SEWAGE", which describes a toilet for dogs configured by a tray, made of rigid material, with concentric recesses to a central hole, from where an elbow derives with piping to the sewage, where the urine of the animal disappears jointly with the water originating from the perimeter of said tray, which arrives by way of the hose connected to a faucet and or the reuse water.

Another patent application owned by the very applicant is BR 10 2018 073116 5, filed on Nov. 9, 2018, relating to AUTOMATED EQUIPMENT FOR CLEANING HYGIENIC TOILETS FOR DOGS, which essentially describes an automated equipment that can be fastened to a household wall, or building balconies, and be fixed to the glass of a toilet shower unit, using a presence sensor, which is directed to the conventional hygienic toilet for dogs or cats, whereas when the dog passes in front of said presence sensor, same sends a signal to its command board, activating its wash cycle which, consequently, drives a solenoid valve that opens the water with disinfectant coming from the dispenser connected to the faucet according to that programmed by its command board, as both are directed to a hose that takes them in the direction of the conventional hygienic toilet.

The equipment described as state of the art, developed by the inventor, comprises toilets that the drain the urine of dogs and cats by the action of gravity, with the variation of toilets that have an irrigation system for washing. The washing can be driven manually or automatically when associated to a modular product that automates the washing by means of a presence sensor. Market products from other origins use other materials to absorb urine.

Therefore, the products commercialized by the applicant, based on the process of draining the urine of dogs and cats by action of gravity need a drain in the proximities and that is not above the drain level of the tray. Accordingly, consumers that do not own residences with said characteristics cannot use the product and benefit from the solutions offered. Other options that do not require a domestic drain need a change of materials (paper, diapers etc.) which often waste time, money and generate residues. Additionally, none of the products present on the market of this area are connected to the internet for consumers to have access to how many times their pet urinates per day, week or month.

SUMMARY

The present invention stands out by presenting a plastic tray with a slight slant of its sides towards the center, where a drain is inserted that communicates, through a flexible plastic hose, with an equally flexible plastic bag, to be positioned on said tray, said bag having a maximum liquid storage volume, the exhaustion time of which will vary according to the size of the animal using toilet. The hose is provided with a type of manual engaging "spigot", and a clamp that acts between making the flow free in the hose or interrupting it, in the latter case with the purpose of enabling emptying. In the central part of the tray, chiefly where the drain is located, a plug is provided with counterweight which, in one position, allows the free passage of the liquid and, in another position, acts as anti-odor.

In another constructive arrangement proposed by the invention, it has a pump that forces the outflow of the urine over major distances and regardless of the level. Additionally, a resource already found in another product by the same applicant, is also present in this product to be patented, that is, the release of water for washing the tray.

In this last embodiment, the invention offers connectivity with the internet, providing the user access to the washing process whenever his or her dog or cat goes to the toilet.

It is an objective of this invention to protect a toilet for pets comprising a tray that receives a mat made of rubberized material composed of modules that fit together until they form the respective size for the surface area of the receptor tray. The animals will perform their physiological needs on this mat.

It is a further objective of the invention to propose a flexible plastic bag, joined to the outlet drain of the tray by an equally flexible hose, this coupling to said bag, to be filled with the liquid produced by the pet. The liquid can be disposed as and when necessary, or when it is completely filled. The flexible bag is supported on a flat base, to be positioned under the tray, remaining non-visible while in use.

Another objective of the invention is to propose a simple and practical means of emptying the flexible plastic bag, when desirable or necessary.

In another embodiment, that is, in a technological version, the invention offers connectivity with the internet, providing the user access to the washing process whenever his or her dog or cat goes to the toilet.

The invention consists of a new toilet designed for use by pets, the solution of which seeks to guarantee that the device toilet or toilet for dogs and cats can be installed in any place in the home, so as to integrate a flexible bag with the toilet destined to receive the liquid originating from the animal, this bag having a capacity to accommodate a certain volume of urine, which can be discarded whenever desired. The bag also receives a rubberized "mat" on top, on which the animal positions itself, where further it can carry out its physiological needs, in the case of feces to be scooped up by the pet owner with a small bag or the like. This set, both bag and mat area, can be sanitized.

In another embodiment, the invention comprises the water solenoid, water pump, switch, 12V power source, power connector, liquid sensor and led. The controller board monitors the presence of liquids through the sensor located in the drain of the tray. Once the presence of liquid has been identified in the drain, the controller board activates the pump to suction the accumulated liquid. Next, the board drives the solenoid valve for a few seconds, enabling the entry of water into the tray in order to wash it. Subsequently, the water pump is driven until the board identifies that there is no more liquid. The cycle being concluded, the controller board once connected to a database sends to an application information on time, date and volume of urine. The switch by means of specific commands enables the toilet to be used off-line and manual wash drives of the toilet.

BRIEF DESCRIPTION OF THE DRAWINGS

The invention will now be described in a form of realization, and for improved understanding and for illustration, references will be made to the accompanying drawings, in which the following is represented.

DETAILED DESCRIPTION OF THE EMBODIMENTS

Figure 1:
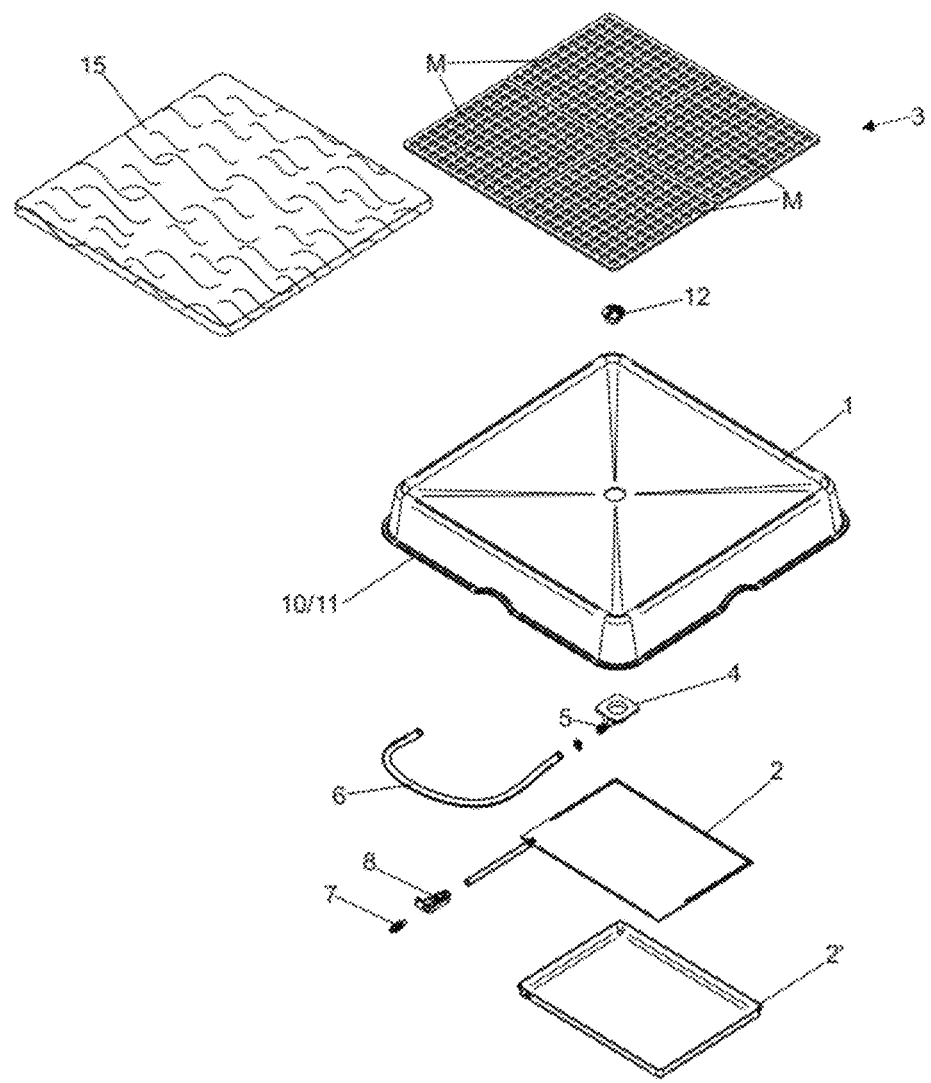
FIG. 1: Shows, in perspective, an overall vision of the device in the main embodiment, with the components separated from each other, illustrating the rubber mat and, optionally, on the mat, the natural or synthetic grass.
Figure 2:
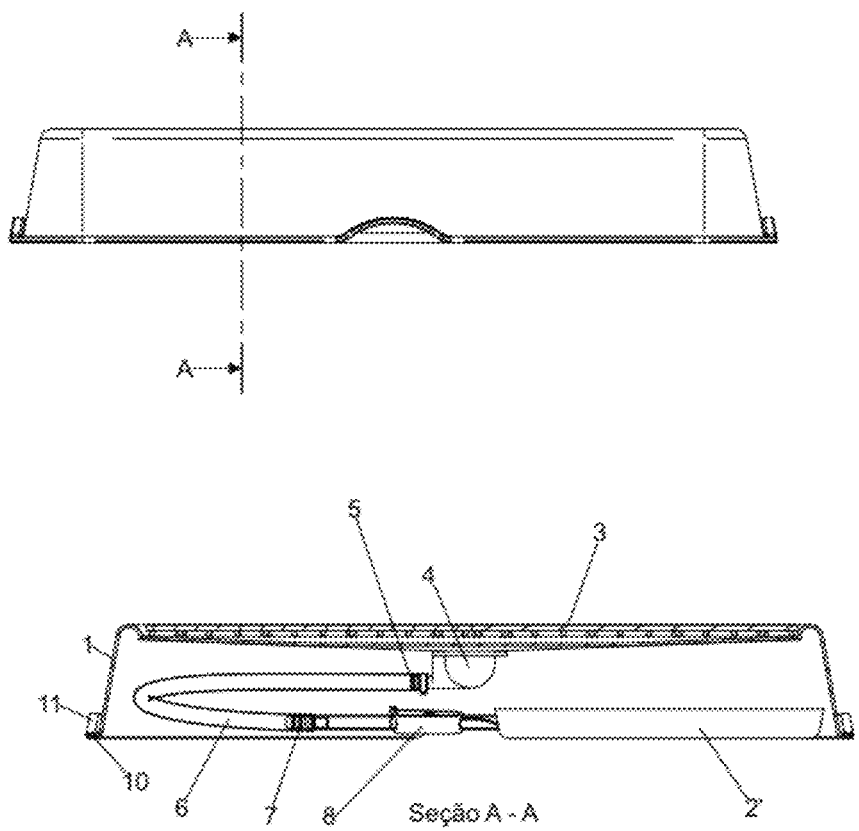
FIG. 2: Shows, in the main embodiment, the invention in cutaway view, illustrating the plastic bag positioned inside the tray.
Figure 3:
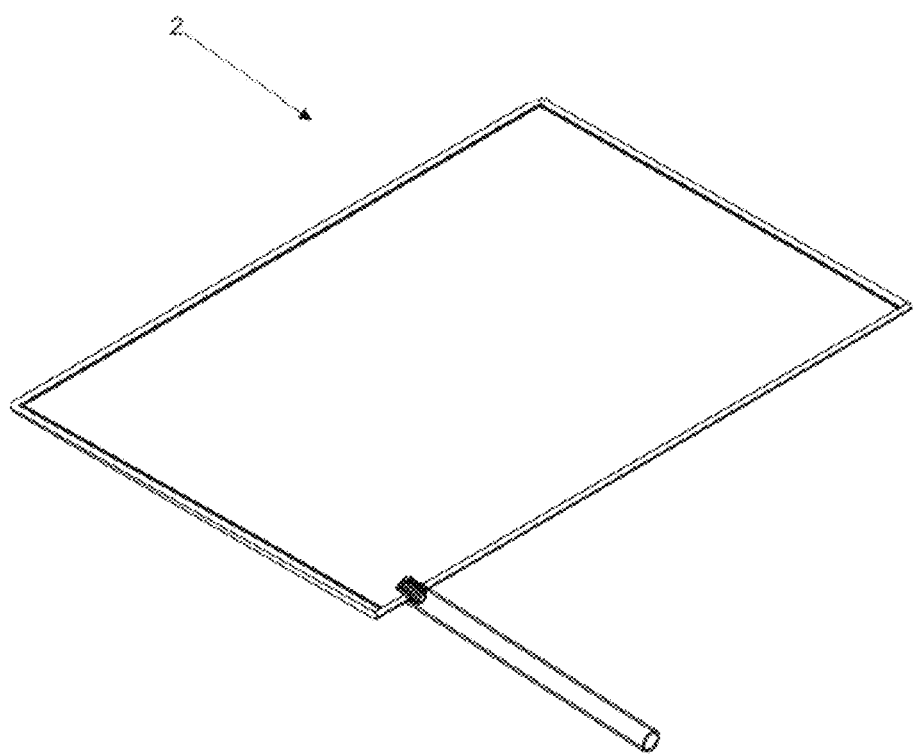
FIG. 3: Shows, in the main embodiment, the plastic bag on its flat base, outside the tray.
Figure 4:
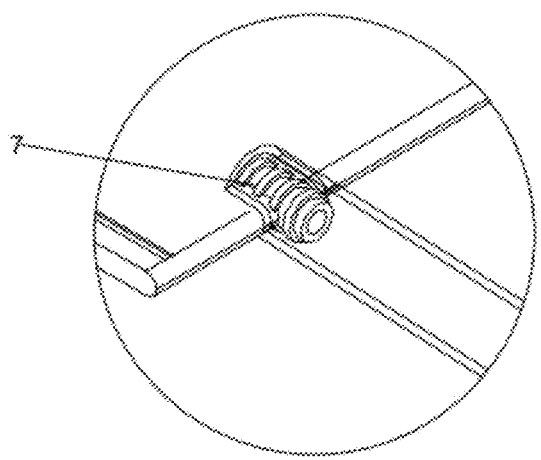
FIG. 4: Shows detail of the "spigot" coupling the flexible hose to the flexible bag.
Figure 5:
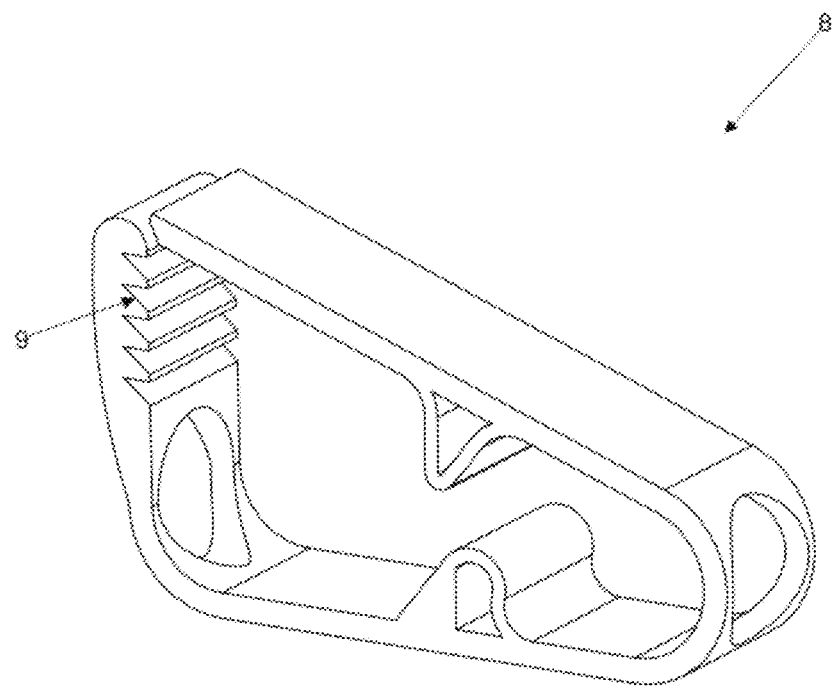
FIG. 5: Shows the detail of the clamp applied to the flexible hose, in the liquid passage release position.
Figure 6:
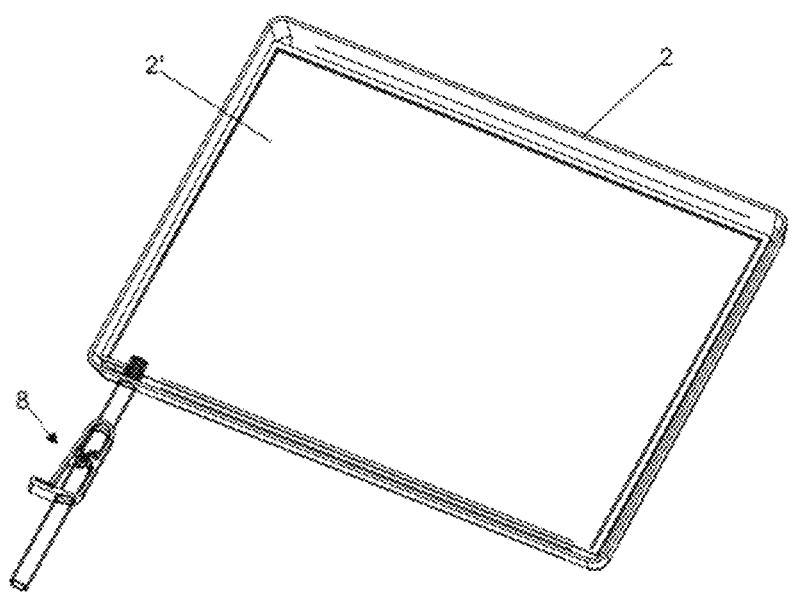
FIG. 6: Shows the detail of the clamp applied to the flexible hose, in the liquid passage blockage position, for the effect of emptying said plastic bag.
Figure 7:
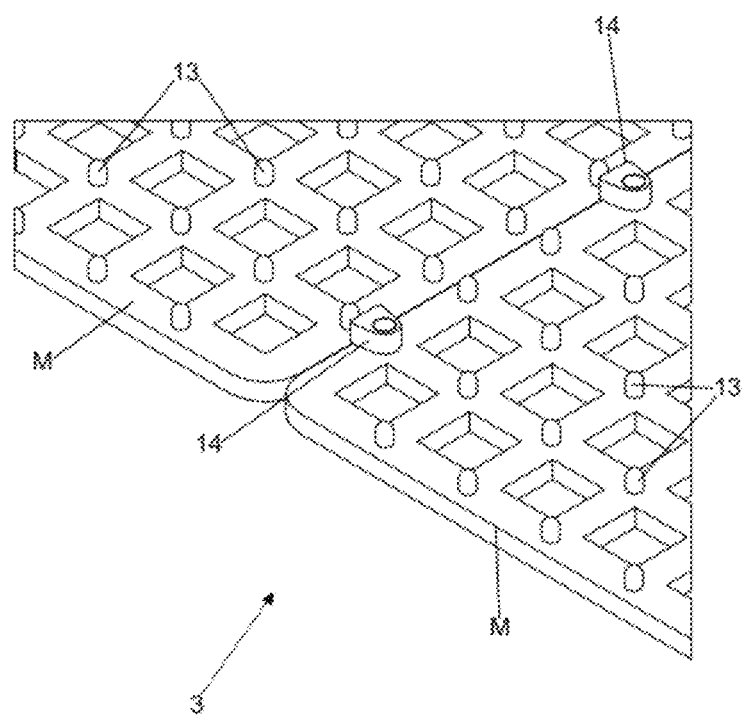
FIG. 7: Shows the fitting detail of the rubber mat modules.
Figure 8A:
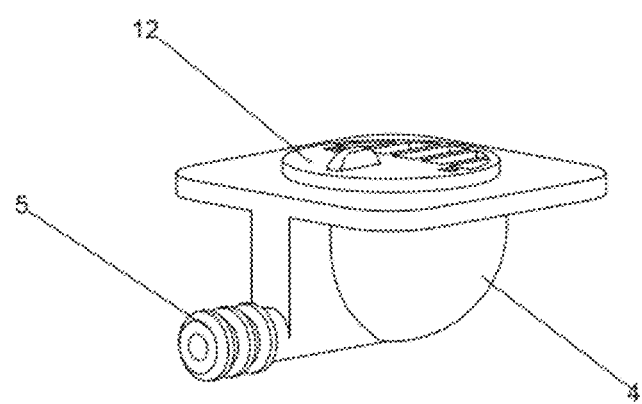
FIG. 8A: Shows in perspective the drain with the plug.
Figure 8B:
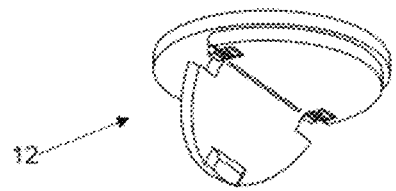
FIG. 8B: Shows a bottom perspective of the plug.

The "TOILET FOR PETS", object of this application for patent of invention, comprises a new toilet designed for use by pets, the solution of which seeks to guarantee that the device toilet or toilet for dogs and cats can be installed in any place in the home, so as to integrate with the toilet a tray made of plastic material (1) and a flexible bag (2) destined to receive the liquid originating from the animal, this bag (2) having a capacity to accommodate a certain origin of urine, and the liquid can be discarded whenever it is desirable to do so; said bag (2) obtained by radiofrequency welding on one of the sides and supported on a flat base (2') to be arranged under the tray (1). The tray (1) further receives a rubberized "mat" (3) on top, on which the animal positions itself, where it may also carry out its needs, urine or feces, latter to be scooped up by the pet owner with a little bag or similar. This set can be sanitized, both the tray (1), bag (2) and the mat area (3); and the design of the mat (3) is to prevent the animal from wetting its paws and also to prevent falls.

The tray (1) has a slight slant towards the center, where a drain (4) is provided, welded by ultrasound, which receives the coupling, at its spigot (5) terminal, of the flexible hose (6), which extends to the flexible plastic bag (2), where a spigot (7) is employed to make the coupling and any release between the parts. near the end of the flexible hose (6), a clamp (8) is provided, anticipated by another spigot (7), said clamp (8) contains adjustment stages (9), with the objective of pressurizing said flexible hose (6) and, therefore, allow the handling of the flexible plastic bag (2) in the sense of emptying it, or else releasing the pressure against said flexible hose (6) and, accordingly, allow the free flow of the liquid expelled by the animal.

The tray (1) configures a contouring flap (10) of the rubberized type (11), so as to prevent slipping during use, whereas the drain (4) receives a plug (12) with counterweight, which acts in the sense of releasing the flow and also preventing the return of odor, among others.

On the tray (1) the rubberized mat (3) is positioned, having, on its contact surface support pins (13), as well as fittings (14) of the male and female type so that the modules (M) can fit together until they form the mat (3) in the size corresponding to the tray (1), the size of which varies according to the size of the animal that will use it.

Therefore, when the mat (3) is arranged on the tray (1), the animal will go there to carry out its physiological needs. Being urine, same flows into the flexible plastic bag (2), where it is stored. This bag (2) has a capacity to store in volume; therefore, the owner of the animal may wait until it is filled, or even empty it after each operation, should he or she so wish, and if he or she is available to do so. This operation is carried out as described above, and can be better understood by way of FIGS. 1 to 7.

If the animal deposits feces on the mat (3), said feces may be removed by using a small plastic bag or the like, it being important to underline that the rubberized mat (3) can be washed and sanitized an infinite number of times, without prejudice to the use or construction thereof.

Figure 9:
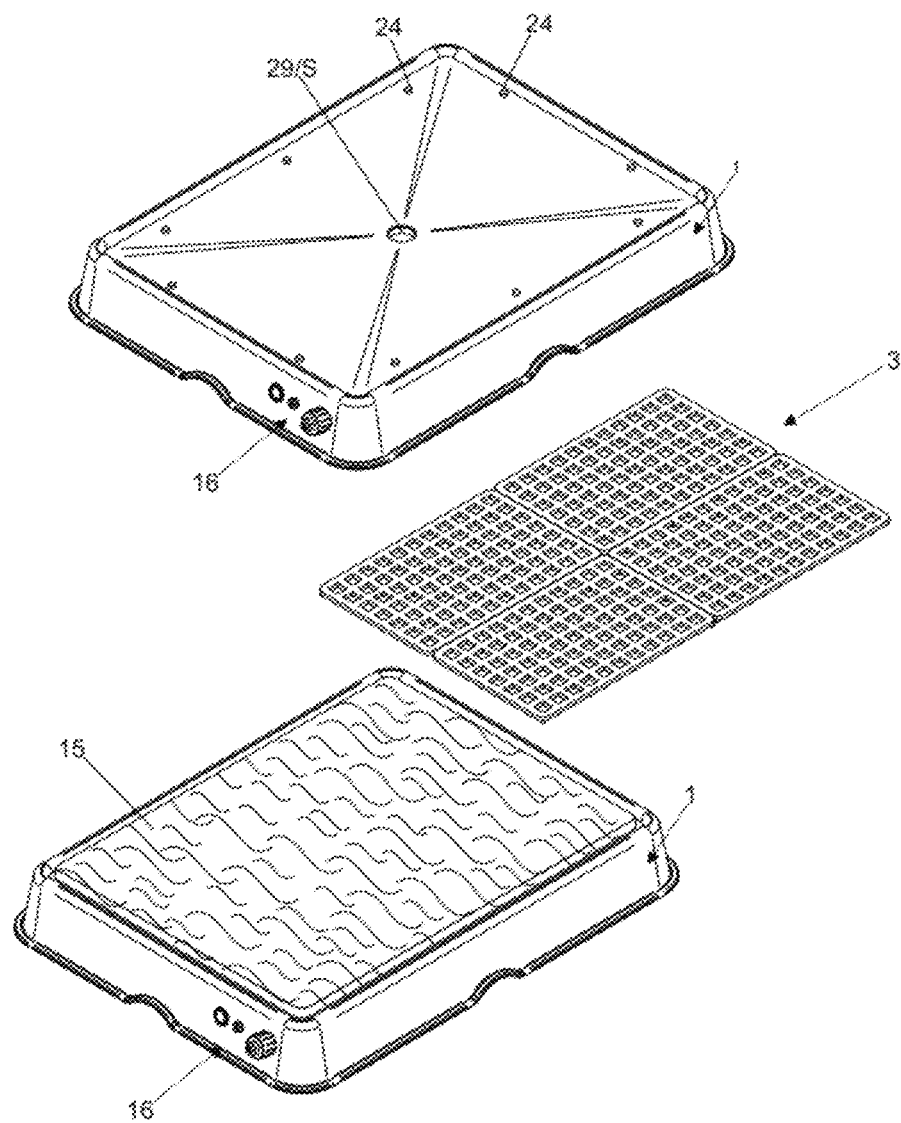
FIG. 9: Shows, in perspective, with an overall view of the device in the alternative embodiment, with a rubber mat and, optionally, on the mat, the natural or synthetic grass.

As can be seen in FIG. 9, there is also the possibility that natural or synthetic grass (15) is used on the mat (3).

FIGS. 9 to 20 show the alternative embodiment, where there is housed, in the center of the tray (1), a urine sensor (S) and, on the sides, water release points (16).

Figure 10:
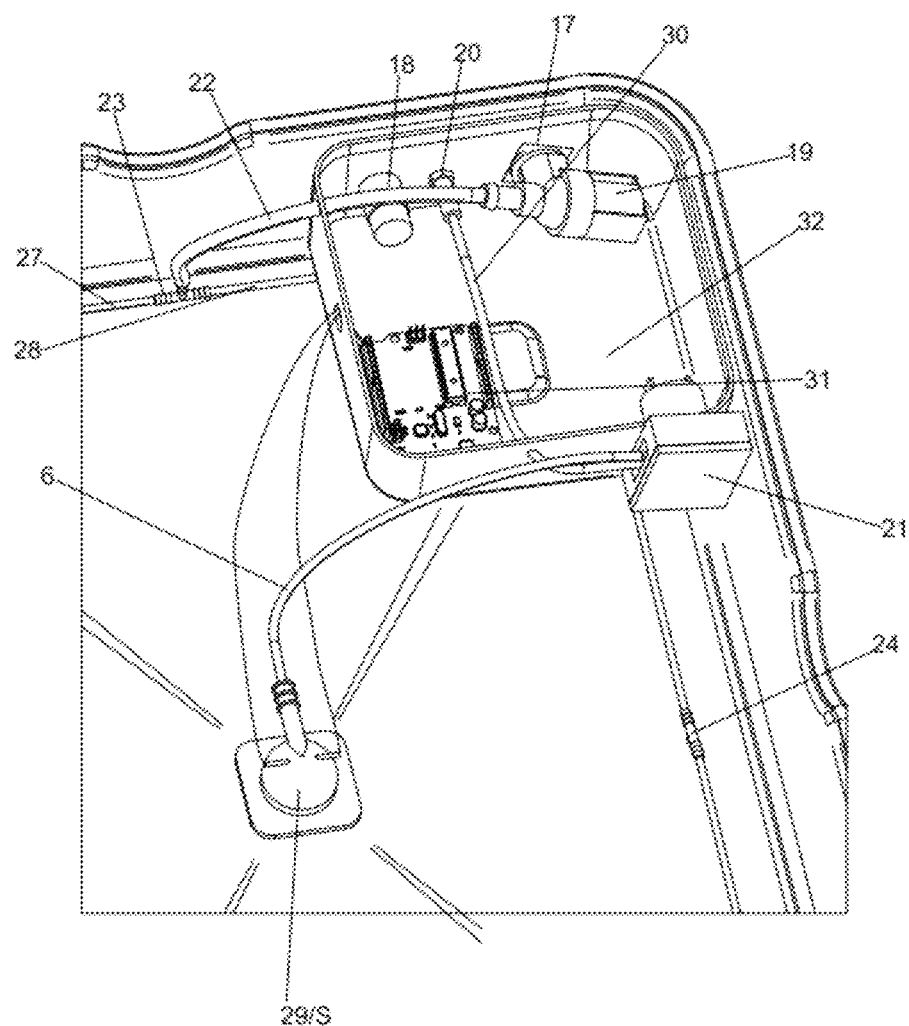
FIG. 10: Shows the inner side of the device in the alternative embodiment, illustrating the components inside it.
Figure 11:
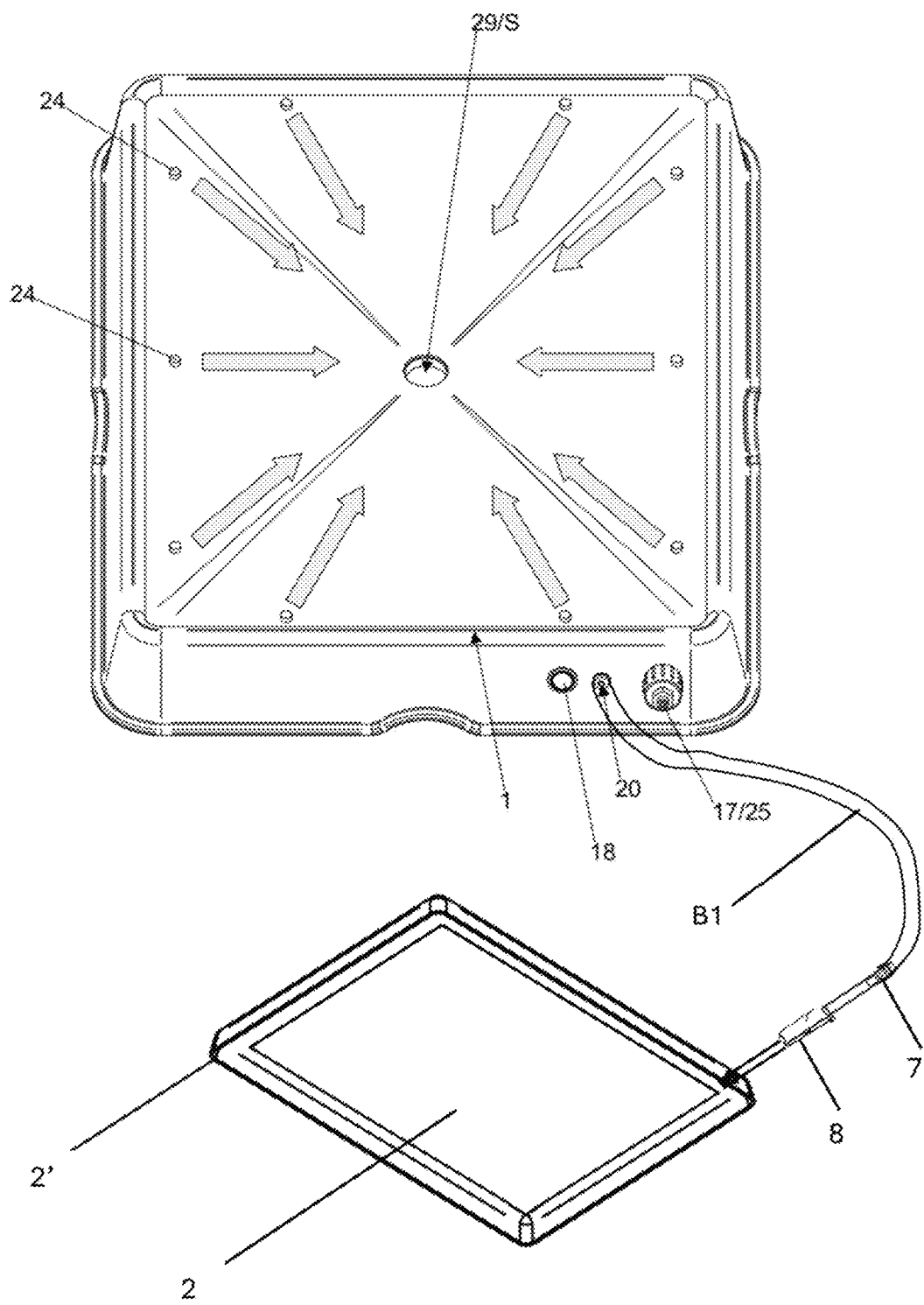
FIG. 11: Shows, in perspective, the top part of the device in the alternative embodiment, with the water flow (spray)
Figure 12:
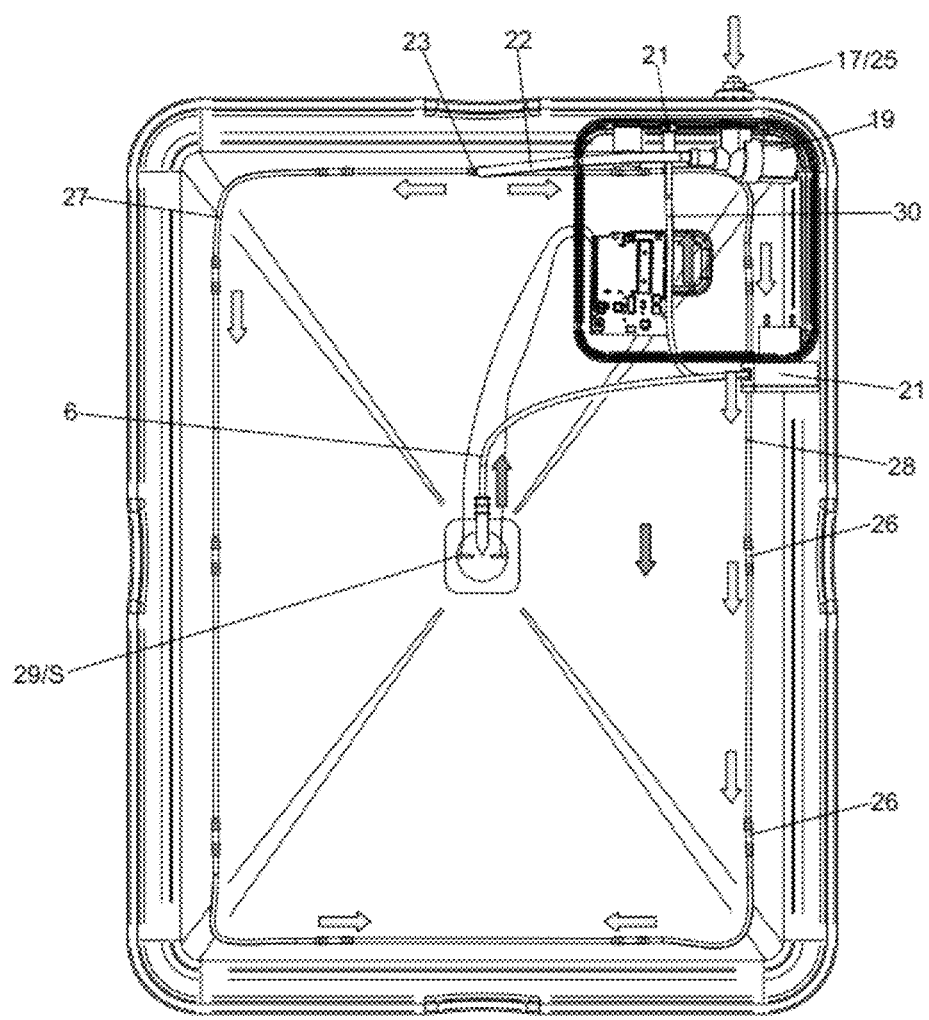
FIG. 12: Shows the inner part of the device with arrows indicating the distribution of water, in the alternative embodiment.
Figure 13:
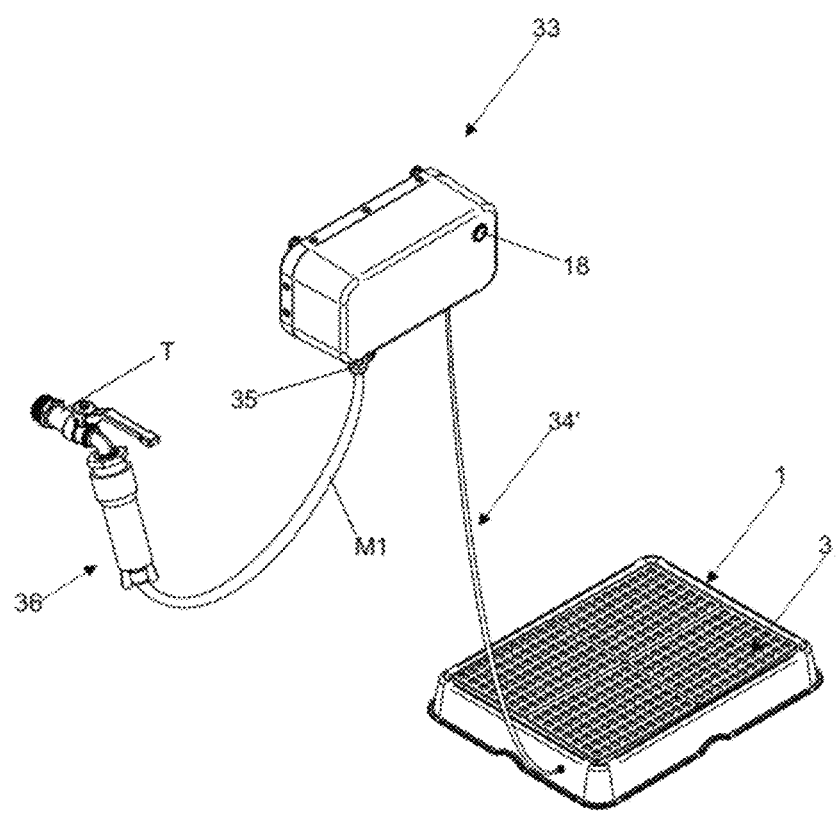
FIG. 13: Shows, in perspective, the device of the invention with an intelligent module, to be fastened at a strategic site inside the building, in the alternative embodiment.
Figure 14:
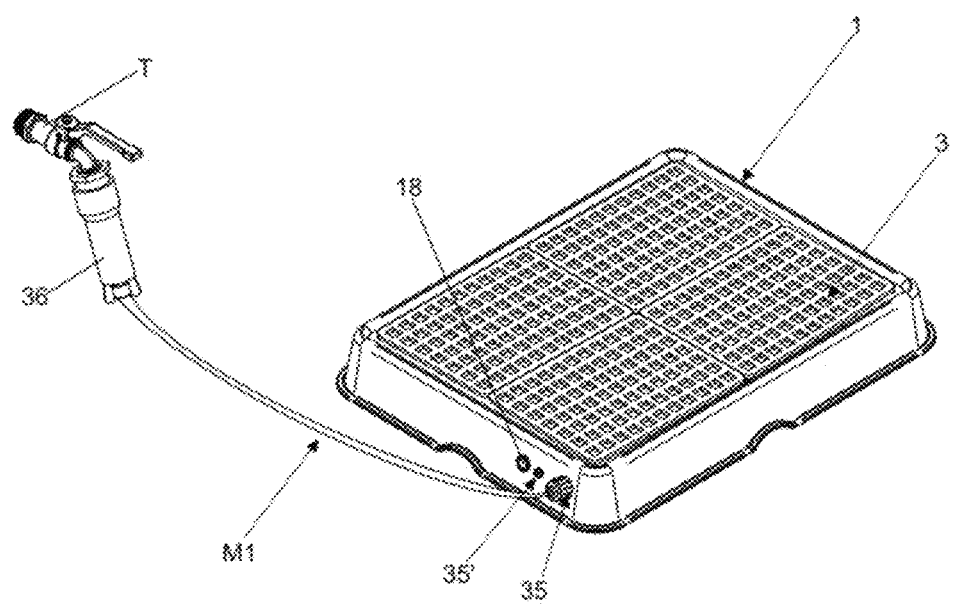
FIG. 14: Shows, in perspective, the device of the invention connected directly to the faucet, without the intelligent module, in the alternative embodiment.
Figure 15:
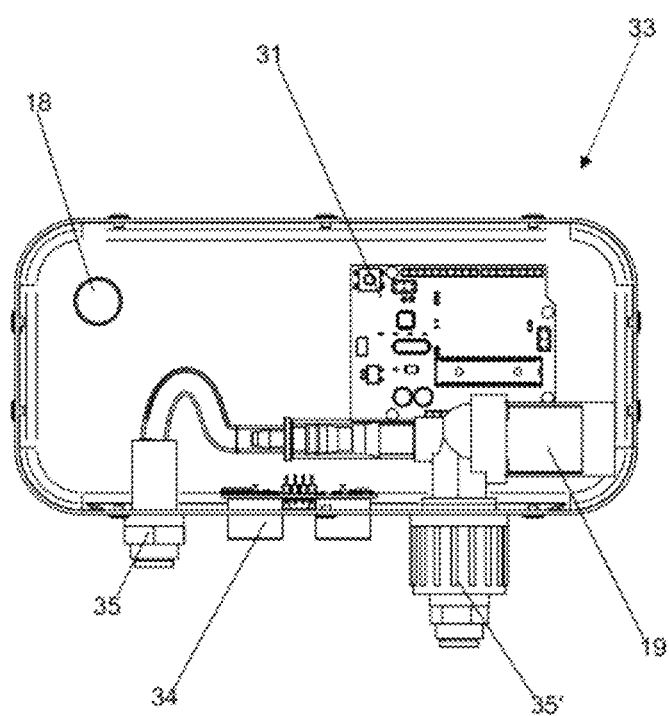
FIG. 15: Shows the inner part of the "intelligent module"
Figure 16:
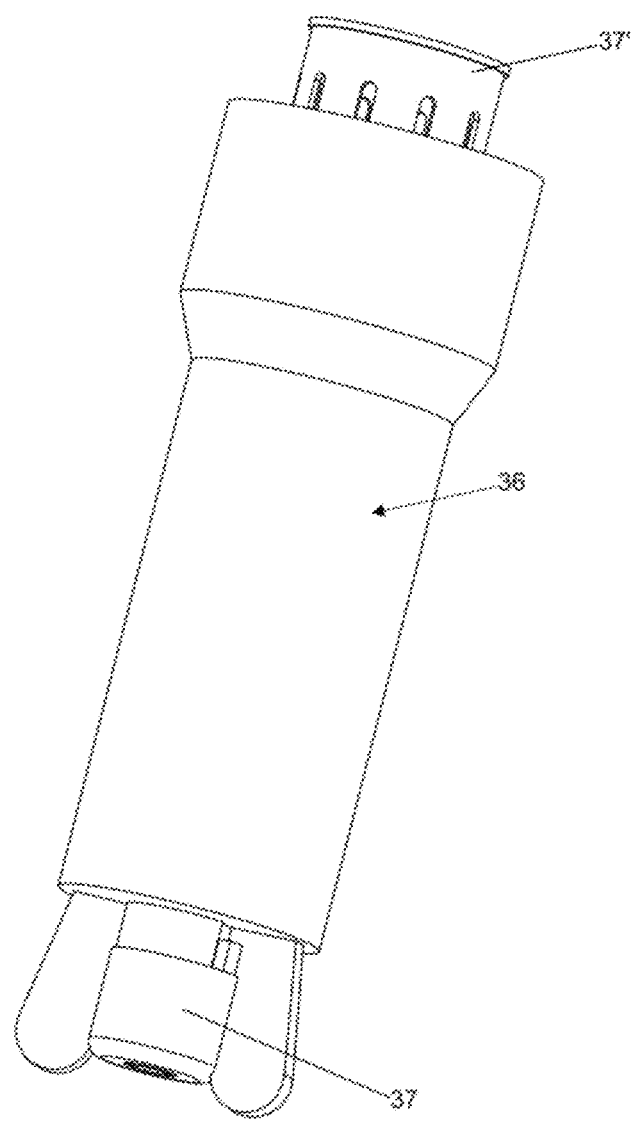
FIG. 16: Shows, in perspective, the body of the dispenser with the butterfly lock and sifter, with the filter sifter highlighted, in the alternative embodiment.
Figure 17:
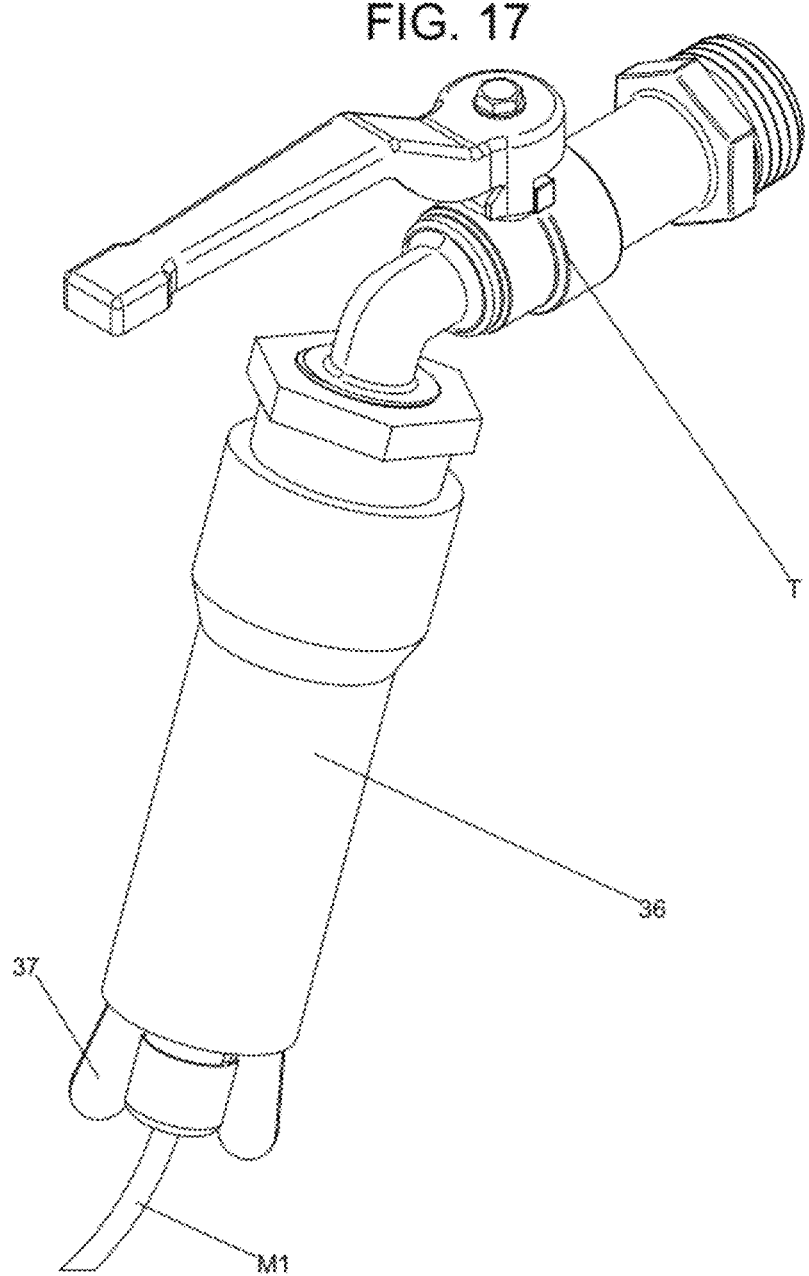
FIG. 17: Shows, in perspective, the dispenser assembled, with the hose and applied to a faucet, in the alternative embodiment.
Figure 18:
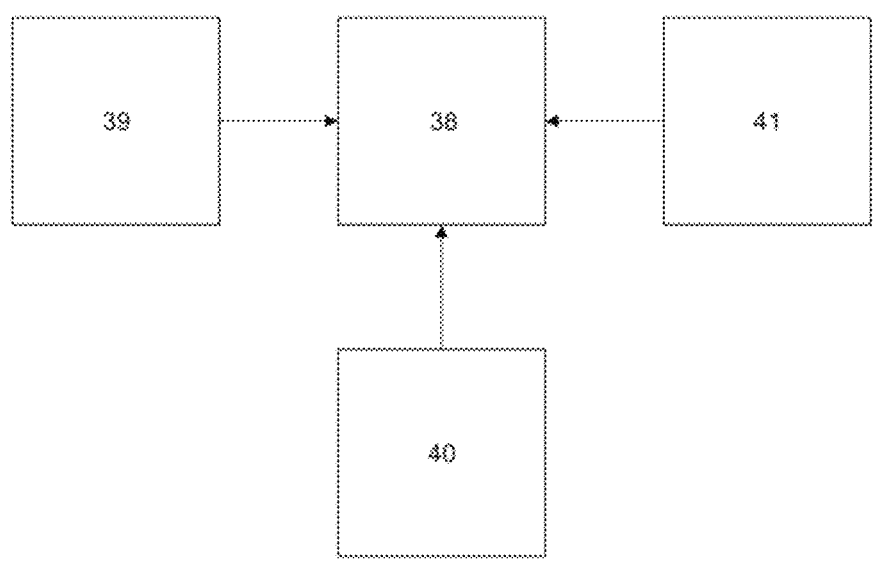
FIG. 18: Shows the electrical diagram applied to the device that is the object of the invention, in the alternative embodiment.

FIG. 10 further shows connectors (17), that can be lateral or inside the tray (1). A switch with led (18) may be coupled sidewardly to the tray (1), indicating, when lit, the status of operation.

The water inlet connector (17) couples to the solenoid valve (19) and the outlet connector (20) connects to a water pump (21), said water pump (21) receives the flexible hose (6) originating from the urine sensor (S).

In this embodiment, the water inlet couples to a solenoid valve (19) projecting a pipeline (22) which connects to the water distribution pipeline (23), which, in turn, passes by all the water release points—dispersers (24) along the contour of the tray (1), so as to promote the distribution of water, when the device is in operation. The tray (1) is supplied with water from the faucet entering through the water inlet (25) which is regulated through the solenoid valve (19) leading to the dispersers (24) by way of the hoses (27 and 28). The water flows to the elbow drain (29), being pumped by means of the water pump (21) to the outlet connection (30).

In this embodiment, the invention includes an e-controller board (31) connecting to the water pump (21), solenoid valve (19), urine sensor (S), switch with led (18).

In this alternative embodiment, a first construction is provided, under the tray (1), where a box (32) is arranged to house the electronic assembly and solenoid valve (19), and the water pump (21).

In this alternative embodiment, in a second constructive option, the invention may be combined with an intelligent remote module (33), fastened at a strategic site, inside of which is the solenoid valve (19), an e-board (31), the presence sensor (34) and the water inlet and outlet points, respectively (35) and (35'), as well as the power supply of the module. Optionally, this intelligent remote module (33) can be connected directly to the tray (1), by way of the hose (34').

A further version of the invention is the use of the flexible bag (2) in toilets with and without automation. In the first case, the bag (2) is connected to the water pump by means of a hose or pipeline (B1) which conducts the urine. In the second case (without automation), the bag (2) is connected directly to the drain of the toilet drain, and the urine will run off to it by gravity.

In this alternative embodiment, the water inlet receives the water feed hose (M1) extending from the tray (1) or from the intelligent remote module (33) to the dispenser (36) which receives a butterfly-type lock (37) and an inner sifter (37'), said dispenser (36) being coupled to a household faucet (T).

The dispenser (36) has the functionality of housing a solid disinfectant which in contact with the water will have the function of sanitizing the tray (1) automatically in the washing process. A hose (M1) connected to the dispenser (36) will be connected, as stated, directly on the water inlet in the tray (1). The disinfectant will be inserted into the inner sifter (37'), which is, as stated, coupled to the body of the dispenser (36). Next, the body is threaded into the faucet (T) and the hose (M) fastened at the lower end, which is subsequently locked by the butterfly lock (37).

Further according to the alternative embodiment, the electric diagram of the invention comprises a processing unit (38) provided in the e-controller board (31), having an energy control unit (39), whereas the 12V output (40) applies to the water pump (21) and solenoid valve (19), while the 5V inputs and outputs apply to the switch with led (18), wherever it is positioned, switch and sensors (S), according to an electronic serial (41). The processing unit (38) communicates, via wireless interface, with a mobile device or similar, and can be operated by way of an application.

Figure 19:
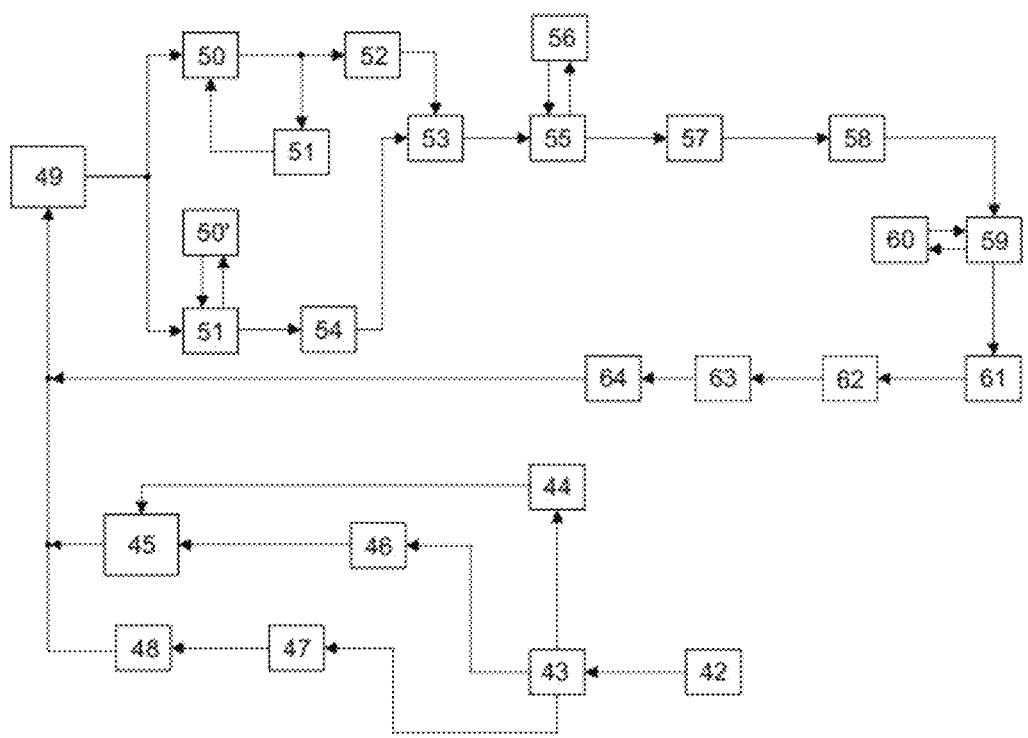
FIG. 19: Shows operating flowchart of the device that is the object of the invention, in the alternative embodiment.

Accordingly, FIG. 19 illustrates in the block (42) the connected device; this connected device, in the block (43), will look for a Wi-Fi network available; if there are no Wi-Fi networks available, the block (44) directs the device to the offline mode (45). If there is no registration, the block (46) conducts the device to said offline mode (45); having located a Wi-Fi network with registration (47), the device is led to the block (48) which places it in online mode.

In this alternative embodiment, FIG. 19 shows the operating diagram of the device of the invention, in which the system being in standby (49) the reading is made of the virtual or physical switch (50), as well as the reading of the urine sensor (S). With the switch (18) not driven (51), the system returns to the block (50). If the reading of the sensor (S) determines that there is no urine (50'), the system returns to the block (51).

If the switch (18) is driven (52), the water pump (21) is driven in the block (53), same condition when the block (54) indicates the presence of urine. The water pump (21), through the block (55), takes the reading of the sensor, if there is urine, block (56); if the sensor determines that there is no urine, block (57), the solenoid valve (19) is connected, the time needed being determined by the application, according to the block (50), the reading of the sensor again being promoted through the block (58), if there is liquid (59), it returns to the block (60); if there is no liquid, according to the block (61), the water pump (21) is disconnected and pauses for 3 (three) minutes, according to the block (62); next, the block (63) determines the connection of the water pump (21) for 20 (twenty) seconds, the cycle (64) then being finalized and returned to the condition of standby (49).

Figure 20:
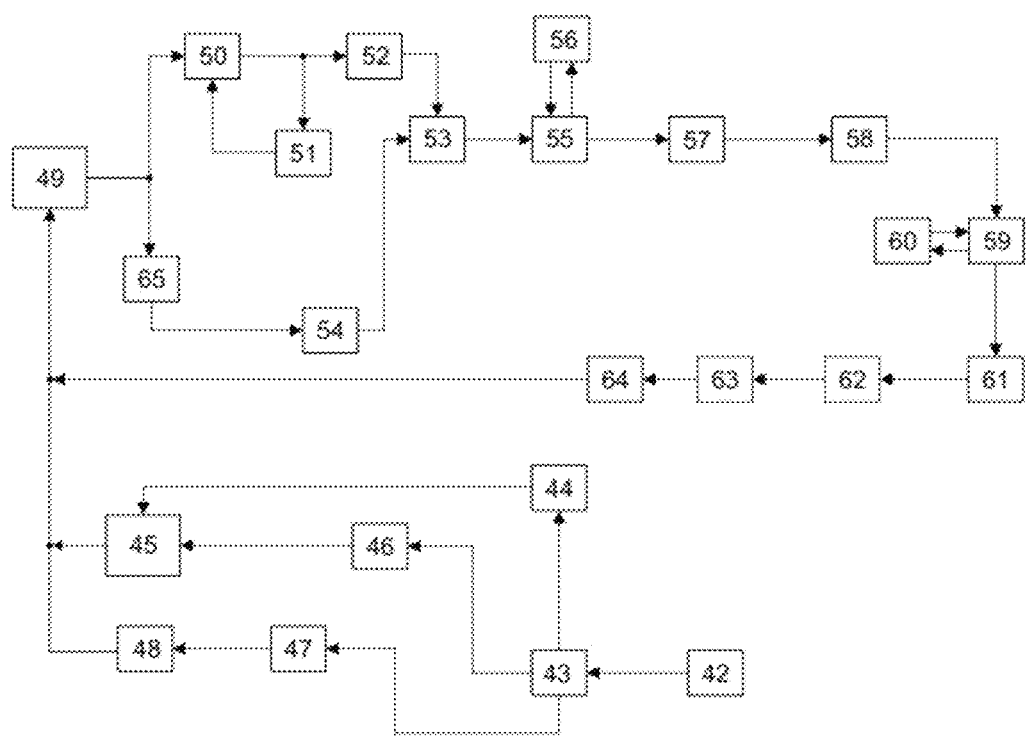
FIG. 20: Shows the operating flowchart of the device that is the object of the invention, including the intelligent module, in the alternative embodiment.

FIG. 20 shows the same diagram as FIG. 19, however, with the insertion of the animal presence sensor (65), present in the intelligent remote module (33), the actuation of which, for release, requires the actuation of the urine sensor in the automatic toilet model and by the presence sensor in the intelligent module.

Operationally, the device (1), according to the invention, comprises the sequence:
Animal pees on the product;
toilet identifies the pee and counts the time defined by the user, so as not to scare the animal;
toilet connects the pump and pumps the pee out of the tray of the device (1);
toilet drives the water inlet to wash the product;
water passes through the cleaning stone which is connected to the faucet and cleans the product;
toilet pumps the water used in the cleaning;

toilet waits for 3 (three) minutes and pumps water traces remaining in the sensor;

toilet sends data to "cloud application" and message application (whatsapp, telegram, facebook messenger, alexa);

user receives notice and monitors use by application remotely;

application adjusts washing time of the toilet, remote and timed drives.

Therefore, the invention stands out for presenting a toilet for animals with a simple, practical, efficient and differentiated construction, which can be used in different places and easily transported, full meeting the needs of the animals and their owners, who find means to make them comfortable in diverse situations, chiefly when they need to be away for the whole day; furthermore, the invention works in the sense of preventing the odor resulting from urine, for example, in addition to having a device for emptying and sanitizing, unprecedented in this segment.

In the alternative, more technological embodiment, the invention also proves to be innovative, combining efficient that corroborate to the acquisition by those desiring improved technology in their device.

The invention claimed is:

1. The toilet for pets, comprising:
    a tray made of plastic material;
    a flexible bag configured to receive liquid from an animal, having the capacity to house the source of urine, being formed by radio-frequency welding on one side and resting on a flat base placed under the tray;
    a rubberized mat positioned on said tray;
    wherein the tray further comprises:
        an inclination towards the center, where there is an ultrasound-welded drain;
        a flexible hose connecting the drain to the flexible bag;
        a clamp positioned near the end of the hose, preceded by a connection nozzle,
    wherein the toilet further comprises a urine sensor housed in the center of the tray, and water release points on sides of the tray; connectors are further provided, which are lateral or inside the tray, a switch with an LED coupled sidewardly to the tray, indicating, when lit, the operation status; a water inlet connector couples to a solenoid valve and, an outlet connector connects to a water pump, said water pump receives a flexible hose coming from the urine sensor.

2. The toilet for pets according to claim 1, wherein the tray receives an e-controller board connecting to the water pump, solenoid valve, urine sensor, switch with the LED.

3. The toilet for pets according to claim 2, comprising a processing unit in the e-controller board, having an energy control unit, and a 12V output is applied to the water pump and solenoid valve while 5V inputs and outputs are applied to the switch with the LED, another switch, the urine sensor, and a presence sensor, according to an electronic serial; and the processing unit communicates, via wireless interface, with a mobile device, and is operated by way of an application.

4. The toilet for pets according to claim 1, comprising an intelligent remote module fastened at a site, inside of which is the solenoid valve, an e-board, a presence sensor, and water inlet and outlet points, as well as a power supply of the module; this intelligent remote module is connected directly to the tray, by the hose.

5. The toilet for pets according to claim 4, wherein the dispenser houses a solid disinfectant, a hose of the dispenser is connected directly on the water inlet, and the disinfectant is inserted into an inner sifter.

6. The toilet for pets according to claim 1, wherein a water inlet couples to a solenoid valve projecting a pipeline that connects to a water distribution pipeline, which, in turn, passes by all water disperser release points along the contour of the tray; the tray is supplied with water from a faucet entering by a the water inlet which is regulated by the solenoid valve which forwards to dispersers by hoses; and the water runs to an elbow drain, being pumped by the water pump to an outlet connection.

7. The toilet for pets according to claim 1, wherein a box is arranged under the tray, configured to house an electronic assembly, the solenoid valve and the water pump.

8. The toilet for pets according to claim 1, wherein the toilet comprises a dispenser coupled to a domestic tap, which receives a butterfly lock and an internal strainer, and a water supply hose extends from the tray or a smart remote module to said dispenser.

* * * * *